United States Patent
Walton

(10) Patent No.: US 9,258,415 B1
(45) Date of Patent: Feb. 9, 2016

(54) COMMUNICATION DEVICE AND RELATED METHODS FOR OFFLINE DATA RECORD MODIFICATION AND SYNCHRONIZATION WITH A BACKEND SERVER ASSOCIATED WITH A RELAY SERVICE FOR HEARING-IMPAIRED USERS

(71) Applicant: CaptionCall, LLC, Salt Lake City, UT (US)

(72) Inventor: Sean Walton, Orem, UT (US)

(73) Assignee: CAPTIONCALL, LLC, Salt Lake City, UT (US)

( * ) Notice: Subject to any disclaimer, the term of this patent is extended or adjusted under 35 U.S.C. 154(b) by 0 days.

(21) Appl. No.: 14/673,341

(22) Filed: Mar. 30, 2015

(51) Int. Cl.
H04M 11/00 (2006.01)
H04M 3/42 (2006.01)
G06F 17/30 (2006.01)

(52) U.S. Cl.
CPC ..... *H04M 3/42391* (2013.01); *G06F 17/30117* (2013.01); *G06F 17/30303* (2013.01); *G06F 17/30581* (2013.01); *G06F 17/30864* (2013.01)

(58) Field of Classification Search
None
See application file for complete search history.

(56) References Cited

U.S. PATENT DOCUMENTS

| | | | |
|---|---|---|---|
| 5,909,482 A | 6/1999 | Engelke | |
| 5,970,488 A | 10/1999 | Crowe et al. | |
| 5,974,116 A | 10/1999 | Engelke et al. | |
| 5,978,654 A | 11/1999 | Colwell et al. | |
| 6,075,841 A | 6/2000 | Engelke et al. | |
| 6,075,842 A | 6/2000 | Engelke et al. | |
| 6,233,314 B1 | 5/2001 | Engelke | |
| 6,307,921 B1 | 10/2001 | Engelke et al. | |
| 6,493,426 B2 | 12/2002 | Engelke et al. | |
| 6,504,910 B1 | 1/2003 | Engelke et al. | |
| 6,510,206 B2 | 1/2003 | Engelke et al. | |
| 6,549,611 B2 | 4/2003 | Engelke et al. | |
| 6,567,503 B2 | 5/2003 | Engelke et al. | |
| 6,594,346 B2 | 7/2003 | Engelke | |
| 6,603,835 B2 | 8/2003 | Engelke et al. | |
| 6,748,053 B2 | 6/2004 | Engelke et al. | |
| 6,882,707 B2 | 4/2005 | Engelke et al. | |
| 6,885,731 B2 | 4/2005 | Engelke et al. | |
| 6,934,366 B2 | 8/2005 | Engelke et al. | |
| 7,003,082 B2 | 2/2006 | Engelke et al. | |
| 7,006,604 B2 | 2/2006 | Engelke | |
| 7,164,753 B2 | 1/2007 | Engelke et al. | |
| 7,319,740 B2 | 1/2008 | Engelke et al. | |
| 7,555,104 B2 | 6/2009 | Engelke | |
| 7,660,398 B2 | 2/2010 | Engelke et al. | |
| 7,881,441 B2 | 2/2011 | Engelke et al. | |
| 8,001,098 B2 | 8/2011 | Matsumoto et al. | |
| 8,051,054 B2 | 11/2011 | Ito et al. | |

(Continued)

*Primary Examiner* — Maria El-Zoobi
(74) *Attorney, Agent, or Firm* — TraskBritt

(57) ABSTRACT

Communication devices configured to assist hearing-impaired users and related methods are disclosed that synchronize unclean data records of a local database with a remote database of a backend server. Communication elements are configured to receive audio signals from a far end communication device, and to receive text captions corresponding to the audio signals from a relay service for display by the communication device during a call. The memory device stores a local database of data records for the communication device. Each data record has at least one flag associated therewith indicating whether the data record is involved in a modification to the local database by the hearing-impaired user. The processor is configured to synchronize unclean data records from the local database with a remote server associated with the relay service responsive to querying flags in the local database that indicate data records that are unclean.

21 Claims, 4 Drawing Sheets

(56) References Cited

U.S. PATENT DOCUMENTS

| | | | |
|---|---|---|---|
| 8,213,578 B2 | 7/2012 | Engleke et al. | |
| 8,379,801 B2 | 2/2013 | Romriell et al. | |
| 8,416,925 B2 | 4/2013 | Engelke et al. | |
| 8,908,838 B2 | 12/2014 | Engelke et al. | |
| 8,917,821 B2 | 12/2014 | Engelke et al. | |
| 8,917,822 B2 | 12/2014 | Engelke et al. | |
| 2005/0237379 A1* | 10/2005 | Brooksby | H04L 29/06027 348/14.11 |
| 2008/0187108 A1* | 8/2008 | Engelke | G10L 15/265 379/52 |
| 2011/0170672 A1 | 7/2011 | Engelke et al. | |
| 2011/0173294 A1* | 7/2011 | Jackson | G06F 17/30575 709/217 |
| 2012/0179653 A1* | 7/2012 | Araki | G06F 17/30575 707/634 |
| 2012/0250837 A1 | 10/2012 | Engleke et al. | |
| 2014/0067921 A1 | 3/2014 | Prophete et al. | |

\* cited by examiner

COMMUNICATION DEVICE AND RELATED METHODS FOR OFFLINE DATA RECORD MODIFICATION AND SYNCHRONIZATION WITH A BACKEND SERVER ASSOCIATED WITH A RELAY SERVICE FOR HEARING-IMPAIRED USERS

FIELD

The application relates generally to telecommunications, and in particular to a communication system with a relay service for assisting hearing-impaired users in communicating with others. More particularly, the disclosure relates to modifying local databases of data records and tracking modifications associated with the communication device.

BACKGROUND

Hearing-impaired individuals may benefit from communication systems and devices configured to provide assistance in order to communicate with other individuals over a communication network. For example, relay services have been established to provide assistive services (e.g., text captions) to the hearing-impaired user communicating with a communication device (e.g., caption phone, caption enabled device, etc.) that is specifically configured to communicate with the relay service.

In particular, a relay service may be a telecommunication intermediary service, which is intended to permit a deaf or a hearing-impaired person to utilize a normal telephone network. The relay service may include an operator, referred to as a "call assistant," who serves as a human intermediary between the hearing-impaired user and a far-end user. During a captioning communication session, the call assistant may listen to the audio signal of a far-end user and "revoice" the words of the far-end user to a speech recognition computer program tuned to the voice of the call assistant. A text caption (also referred to as a "caption") may be generated by the speech recognition computer as a transcription of the audio signal of the far-end user, and then transmitted to the communication device being used by the hearing-impaired user. The communication device may then display the text caption while the hearing-impaired user carries on a normal conversation with the far-end user. The text caption may allow the hearing-impaired user to supplement the voice received from the far-end and confirm his or her understanding of the words spoken by the far-end user.

Such communication devices manage information locally that is also stored remotely, such as contact information and configuration settings. Conventionally, in order to encourage users to be connected to the network and the relay service, modifying the local data was only permitted when there was a network connection to the relay service so that synchronization occurred at the same time as the modification. However, users sometimes had difficulty making modifications at times when the network connection was unreliable (e.g., particularly when used with a wireless network), which caused the modifications to be lost locally.

BRIEF SUMMARY

Embodiments of the disclosure include a communication device associated with a hearing-impaired user. The communication device comprises communication elements, a memory device, and a processor operably coupled with the communication elements and the memory device. The communication elements are configured to receive audio signals from a far end communication device, and to receive text captions corresponding to the audio signals from a relay service for display by the communication device during a call. The memory device stores a local database of data records for the communication device. Each data record has at least one flag associated therewith indicating whether the data record has been modified by the hearing-impaired user. The processor is configured to synchronize unclean data records from the local database with a remote server associated with the relay service responsive to querying flags in the local database that indicate data records that are unclean.

Also disclosed is a method of modifying a local database having data records of a captioning communication device. The method comprises receiving a user input from a hearing-impaired user of the captioning communication device, modifying a local database having data records stored in memory of the captioning communication device responsive to the user input, setting a flag value corresponding to a data record indicating the data record is unclean, transmitting the data record to a backend server of a relay service to update the data record in a remote database stored in memory of the backend server, and setting the flag value indicating the data record is clean after the data record is updated in the remote database.

Also disclosed is a communication system for facilitating communication between a hearing-impaired user and a far-end user. The communication system comprises a backend server associated with a relay service configured to provide text captions of a voice signal associated with the far-end user, the backend server including a remote database, and a plurality of communication devices associated with different hearing-impaired users. Each communication device is configured to receive and display the text captions from the relay service during a call, maintain data records in a local database stored in memory of the communication device, modify the local database responsive to an input by the hearing-impaired user, set a flag to an unclean state associated with a data record that is involved in the modification to the local database, transmit at least a portion of the data records having the flag set to an unclean state to the backend server, and set the flag to a clean state responsive to receiving acknowledgement from the backend server that synchronization was successful.

DETAILED DESCRIPTION

Figure 1:
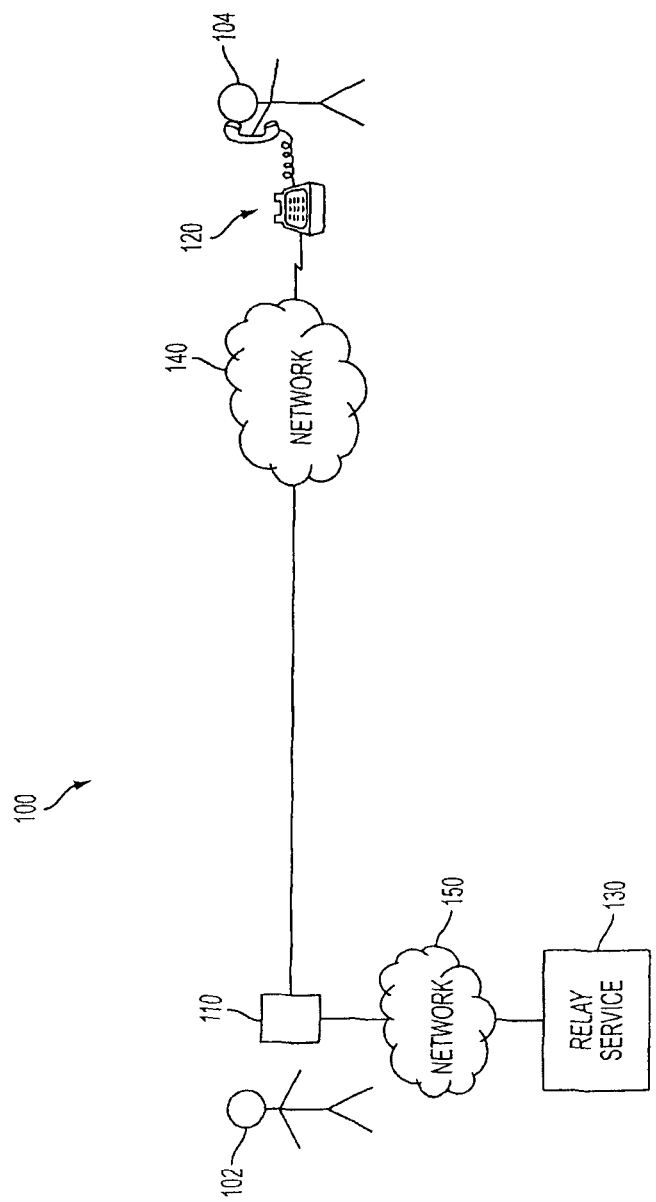
FIG. 1 illustrates a communication system configured to facilitate a call between a hearing-impaired user and a far-end user.

In the following detailed description, reference is made to the accompanying drawings which form a part hereof, and in which is illustrated specific embodiments in which the disclosure may be practiced. These embodiments are described in sufficient detail to enable those of ordinary skill in the art to practice the disclosure. It should be understood, however, that the detailed description and the specific examples, while indicating examples of embodiments of the disclosure, are given by way of illustration only and not by way of limitation. From this disclosure, various substitutions, modifications, additions, rearrangements, or combinations thereof within the scope of the disclosure may be made and will become apparent to those of ordinary skill in the art.

In accordance with common practice, the various features illustrated in the drawings may not be drawn to scale. The illustrations presented herein are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method. In addition, like reference numerals may be used to denote like features throughout the specification and figures.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the disclosure may be implemented on any number of data signals including a single data signal.

The various illustrative logical blocks, modules, circuits, and algorithm acts described in connection with embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein.

A processor herein may be any processor, controller, microcontroller, or state machine suitable for carrying out processes of the disclosure. A processor may also be implemented as a combination of computing devices, such as a combination of a DSP and a microprocessor, a plurality of microprocessors, one or more microprocessors in conjunction with a DSP core, or any other such configuration. When configured according to embodiments of the disclosure, a special-purpose computer improves the function of a general-purpose computer because, absent the disclosure, the general-purpose computer would not be able to carry out the processes of the disclosure. The disclosure also provides meaningful limitations in one or more particular technical environments that go beyond an abstract idea. For example, embodiments of the disclosure provide improvements in the technical field of telecommunications, particularly in a telecommunication system including a relay service for providing text captions to a caption-enabled communication device to assist hearing-impaired users. Embodiments include features that improve the functionality of the communication device such that a new communication device and method for making offline modifications to local information and subsequent synchronization to the backend server are described. As a result, the information management and tracking of modifications of the communication device may be improved in addition to improved reliability of the communication device.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, interfacing with an operating system, etc. Furthermore, the methods disclosed herein may be implemented in hardware, software, or both. If implemented in software, the functions may be stored or transmitted as one or more instructions (e.g., software code) on a computer-readable medium. Computer-readable media includes both computer storage media and communication media including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

As used herein, a "hearing-impaired user" may refer to a person with diminished hearing capabilities. Hearing-impaired users of caption-enabled communication device often have some level of hearing ability that has usually diminished over a period of time such that they can communicate by speaking, but that they often struggle in hearing and/or understanding the far-end user.

The term "call" as used herein refers to the communication session between the hearing-impaired user's communication device and the far-end user's communication device. The call may pass audio signals between the two parties. The term call is used in order to be more easily distinguishable from the captioning communication session. At times, the call may be referred to as incoming or outgoing from the perspective of the hearing-impaired user's communication device. Incoming and outgoing calls may refer to the period of time prior to when the call is "answered" by the other party to begin the communication of the audio signals therebetween.

The term "captioning communication session" as used herein refers to the communication session between the hearing-impaired user's communication device and the relay service. The captioning communication session may pass text captions from the relay service to the hearing-impaired user's communication device. In some embodiments, the captioning communication session may also include the hearing-impaired user's communication device transmitting the far-end user's audio signal to the relay service to generate the text captions.

The term "clean" refers to a data record that has been synchronized with a backend server.

The term "unclean" (or "dirty") refers to a data record that has not been synchronized with the backend server. Thus, an unclean data record may refer to persistent data that has been locally modified (e.g., added, updated, deleted) in a local database prior to the modifications being transmitted to the backend server.

While embodiments described below use captioning communication devices as an example of a device that is configured to perform the offline database modification and data record synchronization, some embodiments may include other types of devices (e.g., embedded devices) that may be intermittently connected to a network that shares the ownership of the data with a back end server.

FIG. 1 illustrates a communication system 100 configured to facilitate an assisted call between a hearing-impaired user 102 and a far-end user 104. The communication system 100 may include a first communication device 110, a second communication device 120, and a relay service 130. The first communication device 110 and the second communication device 120 may be coupled together to facilitate communication therebetween via a first network 140. The first communication device 110 and the relay service 130 may be coupled together to facilitate communication therebetween via a second network 150. For example only, the first network 140 and the second network 150 may each be implemented according to the standards and bandwidth requirements of a communication network (e.g., Public Switch Telephone Network (PSTN), cellular network, Voice Over Internet Protocol (VOIP) networks, etc.). The use of the terms "network" or "communication network" as used herein contemplates networks that are compatible and configured to provide communications using analog and/or digital standards unless specifically stated otherwise. In some embodiments, the first network 140 and the second network 150 may be the same network (e.g., both connections may be Internet-based connections). Thus, discussion of the first network 140 and the second network 150 separately may be for convenience of discussing a particular connection between two or more devices. Of course, in some embodiments, the first network 140 and the second network 150 may be different networks. For example, the first communication device 110 and the second communication device 120 may communicate via a PSTN network connection, while the first communication device 110 and the second communication device 120 may communicate via an internet connection. Other variations and combinations of networks are also contemplated.

The depicted first communication device 110 (FIG. 1) is a device that is configured to assist the hearing-impaired user 102 in communicating with another individual (e.g., far-end user 104). In some embodiments, the first communication device 110 may include a caption-enabled communication device configured to receive and display a text caption of at least a portion of the conversation. Thus, the hearing-impaired user 102 may be able to read the text caption of the words spoken by the far-end user 104 to supplement the audio signal received by the first communication device 110. As a result, the hearing-impaired user 102 may have an improved experience in understanding the conversation. Such an embodiment is especially useful for people whose hearing has been damaged or decreased over time (e.g., the elderly); such that they can still speak, but have diminished hearing that makes it difficult to communicate. In some embodiments, the first communication device 110 is also configured to receive and display video on an electronic display on the first communication device 110.

The second communication device 120 may comprise a conventional voice telephone (e.g., landline phone, cellular phone, smart phone, VoIP phone, etc.). As such, the far-end user 104 may interact in a conventional manner with the second communication device 120. In some embodiments, the second communication device 120 may be configured similarly as the first communication device (e.g., caption-enabled communication device). As a result, the second communication device 120 may likewise be operated by a hearing-impaired user. Thus, although facilitating communication between the hearing-impaired user 102 and the far-end user 104 is shown in FIG. 1 to imply that the far-end user 104 is a hearing-capable user, such a situation is shown only as an example. Other embodiments include both the first communication device 110 and the second communication device 120 coupled to the relay service 130 to facilitate the captioning services for each respective hearing-impaired user (not shown). In such a situation, each communication device 110, 120 may have its own communication session with the relay service 130.

The relay service 130 may be configured to provide interpretive services (e.g., captioning) to the hearing-impaired user 102. More specifically, a human "call assistant" within relay service 130 may be employed to facilitate an assisted call between a hearing-impaired user 102 and a far-end user 104. As discussed above, in some embodiments the relay service 130 may be configured to provide text captions of at least a portion of the conversation. In such an embodiment, the call assistant may listen to the voice signal received and re-voice the portion of the conversation into a microphone so that voice recognition software may generate the text caption that is transmitted to the first communication device 110. Thus, the relay service 130 may include one or more of an internet protocol captioned telephone service (IPCTS), captioned telephone service (CTS), or other telecommunications relay services (TRS).

FIG. 1 shows a configuration where the first communication device 110 acts as a router for the voice signal from the second communication device 120 to the relay service. In such an embodiment, the voice signal of the far-end user 104 may be transmitted from the second communication device 120 to the first communication device 110. The voice signal of the far-end user 104 may then be transmitted from the first communication device 110 to the relay service 130 for the text caption to be generated in a text captioning embodiment. The text caption may then be transmitted from the relay service 130 to the first communication device 110 to be displayed as a text caption for the hearing-impaired user to read during the conversation. The call assistant may also monitor the text caption that is generated and transmitted to the first communication device 110 to identify any errors that may have been generated by the voice recognition software. The call assistant may correct such errors, such as described in U.S. Pat. No. 8,379,801, issued Feb. 19, 2013, entitled "Methods and Systems Related to Text Caption Error Correction," the disclosure of which is incorporated herein in its entirety by this reference. In some embodiments the relay service 130 may be configured to receive the voice signal from the second communication device 120 and route the voice signal to the first communication device 110.

In addition, although FIG. 1 shows only two communication devices 110, 120, the communication system 100 may include more communication devices. It is contemplated that the communication system 100 may facilitate communication between any number and combinations of hearing-impaired users and far-end users. For example, in some embodiments two or more communication devices may be connected for facilitating communication between a hearing-impaired user and other hearing-impaired users and/or far-end users.

Embodiments of the disclosure improve upon the typical communication system by providing an improved method of managing and tracking offline modifications of local information stored in the first communication device 110, and in subsequently synchronizing the information with a backend server associated with the relay service 130. As a result, if modifications to the local data are made when there is not network connectivity (or if network connectivity is lost during synchronization), the communication device may resume at a later time without losing the modifications. Some contributing factors for losing network connectivity may be local issues for the hearing-impaired user, such as a network cable to the first communication device 110 being unplugged, a router being disabled, a spotty WiFi connection, etc. Some contributing factors may be relay service side issues, such as a server problem. Other contributing factors may be issues along the path between the first communication device 110 and the relay service 130, such as a network outage. In any event, offline modifications that are made locally may be preserved and synchronized at a later time when the communication device determines that network connectivity has resumed.

Figure 2:
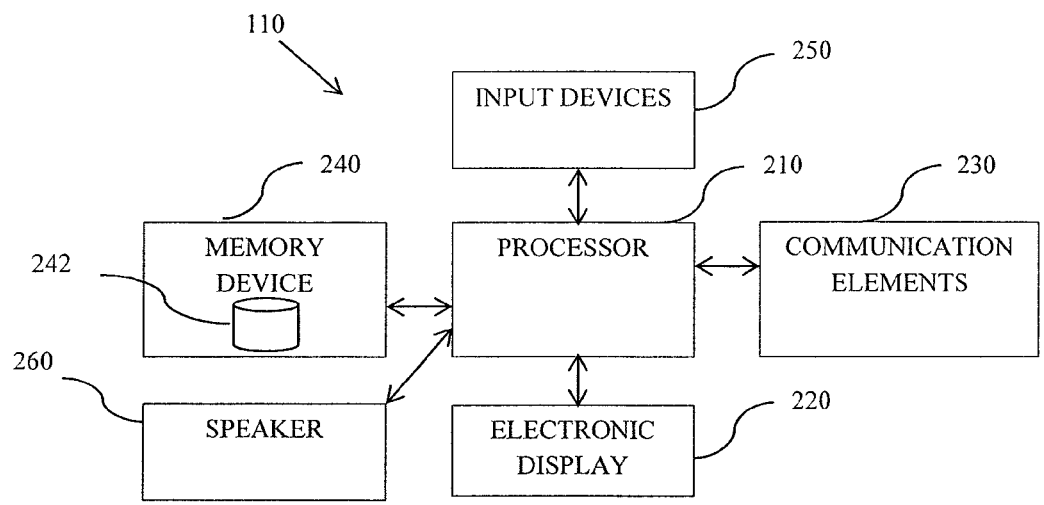
FIG. 2 is a simplified schematic block diagram of a communication device associated with a hearing-impaired user according to an embodiment of the disclosure.

FIG. 2 is a simplified schematic block diagram of the first communication device 110 of FIG. 1. In particular, the first communication device 110 may be configured to establish calls with other communication devices and captioning communication sessions with a relay service configured to assist the hearing-impaired user. The first communication device 110 may be a caption enabled communication device, which may be implemented as a standalone device (e.g., a caption phone), or as implemented on another device (e.g., tablet computer, laptop computer, smart phone, etc.).

The first communication device 110 may include a processor 210 operably coupled with an electronic display 220, communication elements 230, a memory device 240, input devices 250, and a speaker 260. In some embodiments, the first communication device 110 may include a camera for also participating in a video communication session. The processor 210 may coordinate the communication between the various devices as well as execute instructions stored in computer-readable media of the memory device 240. The processor 210 may be configured to execute a wide variety of operating systems and applications including the computing instructions. The memory device 240 may be used to hold computing instructions, data, and other information for performing a wide variety of tasks including performing embodiments disclosed herein. By way of example and not limitation, the memory device 240 may include Synchronous Random Access Memory (SRAM), Dynamic RAM (DRAM), Read-Only Memory (ROM), Flash memory, and the like. The memory device 240 may include volatile and non-volatile memory storage for the first communication device 110.

The communication elements 230 may be configured to communicate with other devices or communication networks, including other communication devices and the relay service. As non-limiting examples, the communication elements 230 may include elements for communicating on wired and wireless communication media, such as for example, serial ports, parallel ports, Ethernet connections, universal serial bus (USB) connections IEEE 1394 ("firewire") connections, Bluetooth wireless connections, 802.1 a/b/g/n type wireless connections, digital enhanced cordless telecommunications (DECT), and other suitable communication interfaces and protocols. The input devices 250 may include a touchscreen, a numeric keypad, a keyboard, a remote control, a mouse, buttons, other input devices, or combinations thereof.

The memory device 240 also includes a local database 242 for the first communication device 110. The local database 242 may include data records such as device settings and other information that is specifically associated with the first communication device 110. For example, device settings may include configurations of the first communication device 110, such as volume settings, text settings (font style, size, etc.), captioning settings (e.g., captions default on/off), etc. Other information that may be specific to a particular communication device 110 may include contact information (e.g., contact name, contact photo, contact address, contact email address, etc.). These data records may be part of a modification (e.g., added, updated, deleted) to a local database by the hearing-impaired user. In some embodiments, some of the data records may also be involved in modifications made remotely by an administrator of the relay service. The data records may be periodically synchronized with a remote server (i.e., backend server 332 in FIG. 3) such that the remote server stores the modifications of the data records remotely as a backup to the data records stored locally by the first communication device 110.

Figure 3:
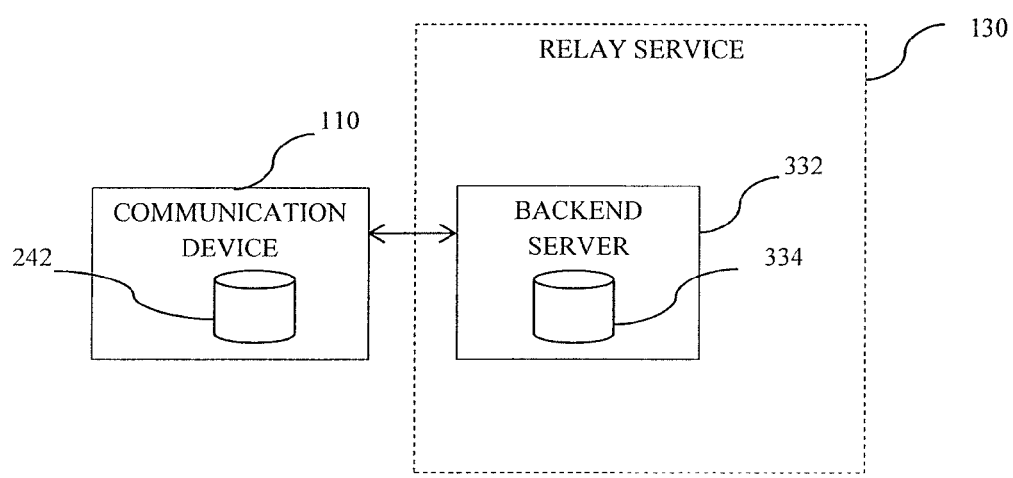
FIG. 3 is a simplified block diagram of a communication system according to an embodiment of the disclosure.

FIG. 3 is a simplified block diagram of a communication system according to an embodiment of the disclosure. The communication system includes the first communication device 110 and the relay service 130 that are configured as discussed above. In particular, the communication device 110, and the relay service 130 may be configured to assist a hearing-impaired user in communication with others by providing text captions to be displayed on the first communication device 110 during a call. The communication device 110 may include the local database 242 (stored in memory). In addition to facilitating captioning communication sessions, the relay service 130 may include a backend server 332 having a remote database 334 that is stored in memory (not shown) of the backend server 332. The remote database 334 may manage data records for the first communication device 110 as well as other communication devices that are part of the communication system. It should be noted that the backend server 332 is described as being part of the relay service 130; however, it should be recognized that the backend server 332 may be located off-site in relation to the call assistants. Thus, the relay service 130 including the backend server 332 means that the backend server 332 is associated with the relay service 130 (e.g., owned and/or operated by the same company or administrator).

As discussed above, the communication device 110 may be configured to modify a local database having data records stored on the first communication device 110. For example, the hearing-impaired user may modify a contact record, configuration settings that may control an operation of the communication device 110, and/or other similar data records. A contact record may include one or more fields such as a contact name, a phone number, a photo, an email address, an address, or other identifying information for an individual contact of the hearing-impaired user.

Modifying the local database may include adding a new data record, updating an existing data record, or deleting a data record. Each data record may be associated with a flag value that indicates each type of modification as well as whether the record is clean or unclean. For example, each data record may have an "add flag," "update flag," and a "delete flag" associated therewith. The add flag may indicate whether the data record has been added (i.e., newly created) since the last time that particular data record was synchronized with the remote database 334. The update flag may indicate whether an existing data record has been updated (i.e., changed) since the last time that particular data record was synchronized with the remote database 334. The delete flag may indicate whether an existing data record has been deleted (i.e., removed) since the last time that particular data record was synchronized with the remote database 334.

In some embodiments, a contact record may include more than one field associated with the contact. Thus, a flag may be shared by multiple fields of the contact record, such that the flag may be updated if any field (e.g., name, number, photo, etc.) of the contact record is modified. In some embodiments, each field of the contact record may have its own flag, such that the flag may be updated if its particular associated field is modified.

Figure 4:
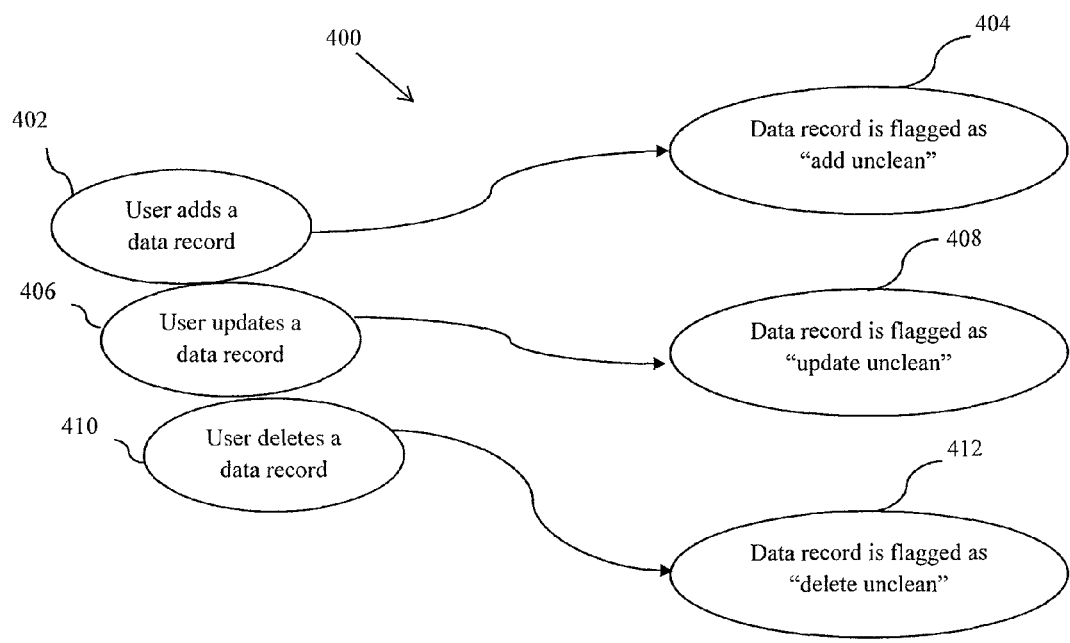
FIG. 4 is a simplified flowchart illustrating a data record being involved in a modification to a local database.

FIG. 4 is a simplified flowchart 400 illustrating a data record being modified according to an embodiment of the disclosure. At operation 402, the user may add a new data record, which results in the data record being flagged as having an "add unclean" state at operation 404. At operation 406, the user may update an existing data record, which results in the data record being flagged as having an "update unclean" state at operation 408. At operation 410, the user may delete an existing data record, which results in the data record being flagged as having a "delete unclean" state at operation 412.

Table 1 shows an example of a plurality of data records and the status of their corresponding flag values. In some embodiments, each data record may have a separate flag for each flag type. For example, each data record may have a separate add flag, update flag, and delete flag associated therewith. Each flag value may be a binary bit (e.g., 0, 1) indicating its state. For example, a flag value of 0 may indicate clean, and a flag value of 1 may indicate unclean, or vice versa, depending on how the communication device 110 is configured to interpret each value.

TABLE 1

| Data Record | Add Flag | Update Flag | Delete Flag |
|---|---|---|---|
| Contact Record A | Clean | Clean | Clean |
| Contact Record B | Clean | Unclean | Clean |
| Contact Record C | Unclean | Clean | Clean |
| Contact Record D | Clean | Clean | Unclean |
| Contact Record E | Clean | Unclean | Clean |
| Setting A | Clean | Unclean | Clean |
| Setting B | Clean | Clean | Clean |

As shown in Table 1, the Contact Record A and Setting B may have all flag values set to be clean. Thus, each of the Contact Record A and Setting B has been unmodified since its last synchronization with the remote database 334. Each of the Contact Record B, Contact Record E, and Setting A may have its respective update flag value set to be unclean. Thus, the Contact Record B, Contact Record E, and Setting A has been modified (e.g., changed) since its last synchronization with the remote database 334. The Contact Record C may have its add flag value set to be unclean. Thus, the Contact Record C has been added as a new data record that has not been synchronized with the remote database 334. The Contact Record D may have its delete flag value set to be unclean. Thus, the Contact Record D has been deleted since the last time that the Contact Record D has been synchronized with the remote database 334. When the communication device 110 synchronizes with the backend server 332, the communication device 110 may be configured to query the flags of the data records, and send the unclean data records to the backend server 332 to update the remote database 334 accordingly. In some embodiments, the unclean data records may be transmitted in subsets of data rather than all at once in order to reduce the load on the backend server 332 (as the backend server 332 may also receive unclean data records from a number of different communication devices at a given time).

When the synchronization is complete, the flag values may be reset to be clean until the next modification. If the synchronization is interrupted (e.g., through a faulty connection, equipment malfunction, etc.), the flag values may remain as unclean. As a result, when the network connection is re-established, the processor may again query the local database 242 and again retrieve the prior unclean data records and any new unclean data records to synchronize with the backend server 332.

In some embodiments, only one flag may be set as unclean at a time for each respective data record. For example, if Contact Record B has its update flag set to unclean, the processor may ensure that the add flag and the delete flag may be set to clean. In some embodiments, a data record may have different flags set to unclean at the same time if it is desired to keep track of multiple states since the last time synchronization occurred. For example, Contact Record C may be a new data record and its add flag may be set to be unclean, after which Contact Record C may be updated before synchronization occurred. As a result, the update flag may also be set to unclean. Other combinations of flag states are also contemplated in such an embodiment.

In some embodiments, the backend server 332 may determine if any modifications to any data records have been made remotely in the remote database 334 that have not been communicated to the communication device 110. In such a situation, the data records may be merged and the unclean records from the backend server 332 may be transmitted to the communication device 110 to update the local database 242. If a data record has a conflict (i.e., the same data record is flagged as unclean by both the local database 242 and the remote database 334), a protocol may be established to determine which takes priority. For example, in some embodiments the backend server 332 may take priority to resolve a conflict if the same data record has been modified at both the communication device 110 and the backend server 332 since a prior synchronization. In some embodiments, the communication device 110 may take priority to resolve such a conflict. In some embodiments, the device that takes priority may be dependent on the type of data record. For example, the communication device 110 may be given priority for contact record conflicts, while the backend server 332 may be given priority for configuration setting conflicts. Other combinations of priorities for resolving conflicts are also contemplated.

In some embodiments, each data record may include additional flag values. For example, the data records may also include an "adding flag," an "updating flag," and a "deleting flag." These flags indicate that synchronization of the data record is in process. The adding flag being in an unclean state indicates that the data record has been added and is in the process of being synchronized with the remote database 334. The updating flag being in an unclean state indicates that the data record has been updated and is in the process of being synchronized with the remote database 334. The deleting flag being in an unclean state indicates that the data record has been deleted and is in the process of being synchronized with the remote database 334. Having these additional states enables the processor to keep track of which data records have been begun the process of synchronization, but where synchronization was not completed.

In some embodiments, each data record may have a separate flag for each flag type. For example, each data record may have a separate add flag, adding flag, update flag, updating flag, delete flag, and deleting flag associated therewith. Each of these flags may have a binary state indicating either clean or unclean.

Table 2 shows an example of a plurality of data records and the status of their corresponding flag values.

TABLE 2

| Data Record | Add Flag | Adding Flag | Update Flag | Updating Flag | Delete Flag | Deleting Flag |
| --- | --- | --- | --- | --- | --- | --- |
| Contact Record A | Clean | Clean | Clean | Clean | Clean | Clean |
| Contact Record B | Clean | Clean | Clean | Unclean | Clean | Clean |
| Contact Record C | Clean | Unclean | Clean | Clean | Clean | Clean |
| Contact Record D | Clean | Clean | Clean | Clean | Clean | Unclean |
| Contact Record E | Clean | Clean | Clean | Unclean | Clean | Clean |
| Contact Record F | Unclean | Clean | Clean | Clean | Clean | Clean |
| Contact Record G | Clean | Clean | Unclean | Clean | Clean | Clean |
| Contact Record H | Clean | Clean | Clean | Clean | Unclean | Clean |
| Setting A | Clean | Clean | Clean | Unclean | Clean | Clean |
| Setting B | Clean | Clean | Clean | Clean | Clean | Clean |

As shown in Table 2, the Contact Record A and Setting B may have all flag values set to be clean. Thus, each of the Contact Record A and Setting B has been unmodified since its last synchronization with the remote database 334. Each of the Contact Record B, Contact Record E, and Setting A may have its respective updating flag value set to be unclean. Thus, the Contact Record B, Contact Record E, and Setting A has been modified and is in process of being synchronized with the remote database 334. The Contact Record C may have its adding flag value set to be unclean. Thus, the Contact Record C has been added as a new data record and is in process of being synchronized with the remote database 334. The Contact Record D may have its delete flag value set to be unclean. Thus, the Contact Record D has been deleted and is in process of being synchronized with the remote database 334. In addition, Contact Record F may have its add flag set to unclean, Contact Record G may have its update flag set to unclean, and Contact Record H may have its delete flag set to unclean. Thus, Contact Records F, G, H may have been modified after contact records B, C, D, E began processing for synchronization. If the network connection were to fail during that synchronization, the processor may retrieve all of the Contact Records B through H in the next attempt at synchronization as they all would be considered having an unclean state.

As discussed above, each data record may have a plurality of different flags corresponding to the different types of modifications. In some embodiments, each record may have a single flag that has a plurality of different states for the different types of modifications. Thus, the flag may be multiple bits in length to support the indication of a variety of different types of modifications. For example, in Table 3, each flag is shown to have one of at least 4 different states (e.g., Clean, Update Unclean, Add Unclean, Delete Unclean).

TABLE 3

| Data Record | Flag |
| --- | --- |
| Contact Record A | Clean |
| Contact Record B | Update Unclean |
| Contact Record C | Add Unclean |
| Contact Record D | Delete Unclean |
| Contact Record E | Update Unclean |
| Setting A | Update Unclean |
| Setting B | Clean |

Table 4 shows an embodiment that further includes the additional in process states. As a result, each flag may be set to have one of at least 7 different states (e.g., Clean, Update Unclean, Updating Unclean, Add Unclean, Adding Unclean, Delete Unclean, Deleting Unclean).

TABLE 4

| Data Record | Flag |
| --- | --- |
| Contact Record A | Clean |
| Contact Record B | Updating Unclean |
| Contact Record C | Adding Unclean |
| Contact Record D | Deleting Unclean |
| Contact Record E | Updating Unclean |
| Setting A | Updating Unclean |
| Setting B | Clean |

There may be some situations in which a modified record may be modified offline multiple times prior to being synchronized with the remote server. For example, a user may update a data record (flag=update unclean) at a first time, and then update the same data record again at a second time before the data record is synchronized with the backend server 332. In such a situation, the second set of updates may be merged with the first set of updates so that a single data record still exists with the flag still set to update unclean. In another situation, the data record may be added (flag=add unclean) at a first time, and then the user may update the same added data record at a second time before the added data record is synchronized with the backend server 332. In such a situation, the set of updates may be merged with the added data record so that a single data record still exists. Because the data record is new and there is no corresponding record yet in the remote database 334, the flag may still be set to add unclean so that the backend server 332 knows that it is a data record being added. The backend server 332 may not need to know of the updated data.

In another situation, a user may update a data record (flag=update unclean) at a first time, and then delete the updated data record at a second time before the data record is synchronized with the backend server 332. In such a situation, the flag may be changed from update unclean to delete unclean. Thus, when the backend server 332 receives the modification, the backend server 332 may know that the data record should be deleted—making the prior unknown updates moot. In another situation, the data record may be added (flag=add unclean) at a first time, and then the user may delete the same added data record at a second time before the added data record is synchronized with the backend server 332. In such a situation, the data record may simply be discarded locally without needing to be synchronized with the backend server 332 because the backend server 332 has no record of the added data record so there is nothing for the backend server 332 to delete.

In yet another situation, a user may delete a data record (flag1=delete unclean) at a first time, and then add a new data record (flag2=add unclean) at a second time having the same information as the deleted data record. In such a situation, both the deleted data record and the added data record may be transmitted even though the same information may be present. This may ensure that duplicate entries do not exist.

In each of these above situations, modifications may be tracked with flags with subsequent modifications being merged with the same data record as opposed to many database systems that use a queue for each and every modification for each entry that has been modified that needs to be processed in the order that the individual modification occurred.

Figure 5:
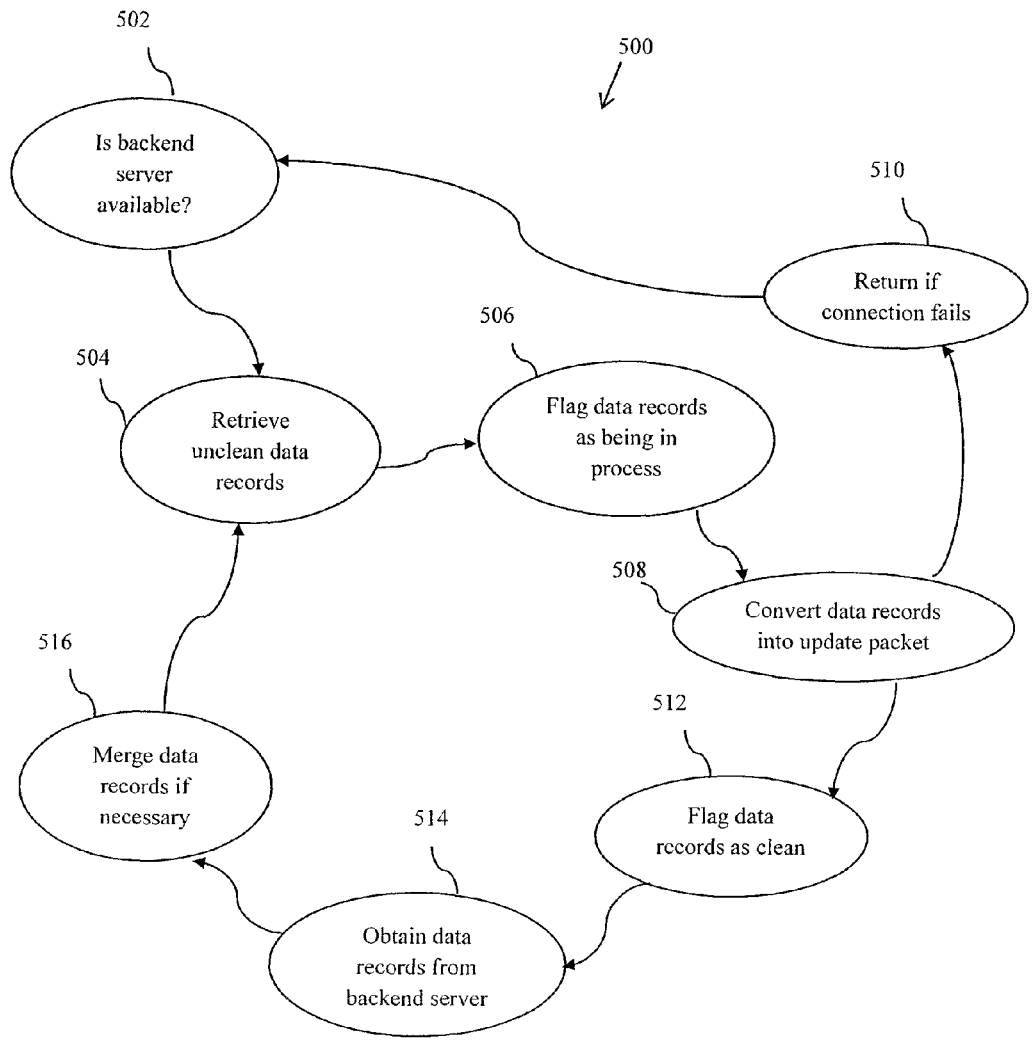
FIG. 5 is a flow diagram illustrating a method for synchronizing a data record of a communication device according to an embodiment of the disclosure.

FIG. 5 is a flow diagram 500 illustrating a method for synchronizing a data record of a communication device according to an embodiment of the disclosure. The different operations may be executed by a processor of a communication device according to instructions provided to the processor. Communication between the communication device and the backend server may be performed through the communication elements (e.g., transmitter, receiver, transceiver, etc.) of the communication device. As discussed above, a hearing-impaired user may modify data records stored in the local database of the communication device. Modifying data records includes adding, updating, and deleting data records. The communication device also flags the modified data record as being unclean until the modified data record is synchronized with the backend server. For the following example, it is presumed that the hearing-impaired user has modified at least one data record that has been flagged as unclean.

At operation 502, the communication device may determine if the backend server is available. In some embodiments, the processor of the communication device may monitor the network connectivity between the communication device and the backend server. If a discontinuity is detected, the processor may be cease attempts to synchronize unclean data records. As a result, the processor may notify the data record synchronization processing subsystem to cease attempts to synchronize data records until network connectivity is re-established. As an example, the communication device may periodically send a message to the backend server to determine whether the message is received. If an appropriate return message is received by the communication device, the communication device may determine that the backend server is available. If no return message is received, the communication device may determine that the backend server is not available. In some situations, a return message may be received that indicates that there is not adequate connectivity. For example, the return message may indicate that the backend server did not understand the message sent. In some embodiments, other features may also be monitored to determine whether there is network connectivity. For example, a pin on the circuit board may be monitored to indicate whether an Ethernet connection is functioning, a wireless driver may detect that whether a wireless connection to a local access point is functioning, etc.

At operation 504, the communication device may retrieve un-clean data records from the local database. For example, the processor may be query the local database according to the different states of the flags and identify the data records having flags that are set to be unclean. Unclean states may include being added, updated, or deleted.

At operation 506, the unclean data records may be flagged as being in process (e.g., adding, updating, deleting). At operation 508, the unclean data records may be converted into an update packet to be transmitted to the backend server. In some embodiments, all unclean data records may be part of a single update packet to be transmitted to the backend server. In other embodiments, the unclean data records may be divided into a plurality of different update packets that are transmitted in sub-groups over a period of time to the backend server. As a result, the updates from the communication device may be staggered to the backend server so that the backend server may be less likely to be overwhelmed when receiving updates from many different communication devices.

If the network connection fails prior to the update packet being transmitted to the backend server, the method may return at operation 510 to the beginning and wait until the backend server is again available to try again. As discussed above, network connectivity may fail for various reasons, and the processor of the communication device may monitor network connectivity and notify the data record synchronization processing subsystem to cease attempts to synchronize data records if a failure is detected. If the network connection does not fail, the update packet may be transmitted to the backend server and the associated data records may be flagged as clean at operation 512. In some embodiments, the communication device may receive an acknowledgment from the backend server prior to flagging the data records as clean.

In some embodiments, the communication device may also obtain data records from the backend server at operation 514. For example, an administrator of the backend server may, at times, modify records stored in the remote database that need to be synchronized with the communication device. At operation 516, these modified data records from the backend server may be merged into the local database of the communication device. If a data record has a conflict (i.e., the same data record is flagged as unclean by both the local database and the remote database), a protocol may be established to determine which takes priority as discussed above.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. A communication device associated with a hearing-impaired user, the communication device comprising:
    communication elements configured to receive audio signals from a far end communication device, and to receive text captions corresponding to the audio signals from a captioning communication service for display by the communication device during a call;
    a memory device storing a local database of data records for the communication device, each data record having at least one flag associated therewith indicating whether the data record has been locally modified by the hearing-impaired user responsive to a user input to the communication device; and
    a processor operably coupled with the communication elements and the memory device, the processor configured to synchronize unclean data records from the local database with a remote database of a remote server associated with the captioning communication service responsive to querying flags in the local database that indicate data records that are unclean, wherein the at least one flag includes an add flag, an update flag, and a delete flag that are set locally as either clean or unclean responsive to the user input to the communication device prior to synchronization with the remote server, wherein the add flag is indicative of a new data record being created since the last time synchronization occurred with the remote database, the update flag is indicative of an existing data record being changed since the last time synchronization occurred with the remote database, and a delete flag is indicative of an existing data record being removed since the last time synchronization occurred with the remote database.

2. The communication device of claim 1, wherein the add flag, the update flag, and the delete flag are separate flags that are each set as either clean or unclean.

3. The communication device of claim 2, wherein the add flag, the update flag, and the delete flag are represented as a single flag that has a plurality of different states for different types of unclean data.

4. The communication device of claim 2, wherein the processor is configured to synchronize the unclean records by querying the local database for flags set to be unclean, and transmitting the unclean data records to the remote server in at least one group of data.

5. The communication device of claim 1, wherein the at least one group of data is a plurality of groups of data that are sent separately over a period of time.

6. The communication device of claim 1, wherein the communication elements are configured to receive the audio signals from the far end communication device through a PSTN network, and to receive captions from the captioning communication service through an IP network.

7. The communication device of claim 1, wherein the data record includes at least one of a contact and a configuration setting.

8. The communication device of claim 1, wherein the contact information includes at least one of a contact name, a contact number, a contact email address, and a contact picture.

9. A method of modifying a data record of a captioning communication device, the method comprising:
   receiving a user input from a hearing-impaired user of the captioning communication device;
   modifying a local database having data records stored in memory of the captioning communication device responsive to the user input;
   setting a flag value locally within the captioning communication device corresponding to a data record indicating the data record is unclean responsive to a user input to the captioning communication device, the flag value being one of an add unclean, an update unclean, or a delete unclean depending on a type of modification made to the local database for the data record by the user input, wherein the flag value being set as add unclean is indicative of a new data record being created by the user input since the last time synchronization occurred with the remote database, the flag value being set as update unclean is indicative of an existing data record being changed by the user input since the last time synchronization occurred with the remote database, and the flag value being set as delete unclean is indicative of an existing data record being removed responsive to the user input since the last time synchronization occurred with the remote database;
   transmitting the data record to a backend server of a captioning communication service to update the data record in a remote database stored in memory of the backend server; and
   setting the flag value indicating the data record is clean after the data record is updated in the remote database.

10. The method of claim 9, wherein setting a flag value indicating the data record is unclean includes setting a different state of a single flag value.

11. The method of claim 9, further comprising setting another flag value locally within the captioning communication device to be one of adding unclean, updating unclean, or deleting unclean depending on a type of modification made to the corresponding data record of the local database while transmission of the data record from the captioning communication device to the remote database is in process during synchronization.

12. The method of claim 9, further comprising setting a separate flag value for each of an adding unclean state, updating unclean state, and deleting unclean state depending on a type of modification made to the corresponding data record of the local database while transmission of the data record from the captioning communication device to the remote database is in process during synchronization.

13. The method of claim 9, further comprising monitoring network connectivity between the captioning communication device and the backend server, and ceasing attempts to transmit the data record to the backend server if a failure is detected.

14. The method of claim 9, wherein transmitting the data record to the backend server is packaged together in an update package with a plurality of additional data records that are identified as being unclean.

15. The method of claim 14, wherein the update package includes a subset of all data records presently identified as being unclean.

16. The method of claim 9, wherein modifying the local database includes at least one of adding a new data record, updating an existing data record, and deleting an existing data record.

17. The method of claim 9, wherein modifying the local database includes updating an existing data record at a first time, and updating the updated existing data record at a second time while maintaining the same flag value as update unclean prior to synchronization.

18. The method of claim 9, wherein modifying the local database includes updating an existing data record at a first time, and deleting the updated existing data record at a second time while changing the flag value from update unclean to delete unclean prior to synchronization.

19. The method of claim 9, wherein modifying the local database includes adding a new data record at a first time, and deleting the newly added data record at a second time prior to synchronization and removing the newly added data record from the local database without transmitting the newly added data record to the backend server.

20. A communication system for facilitating communication between a hearing-impaired user and a far-end user, the communication system comprising:
   a backend server associated with a captioning communication service configured to provide text captions of a voice signal associated with the far-end user, the backend server including a remote database;
   a plurality of communication devices that are intermittently connected with the backend server, wherein each communication device is specifically configured to assist communication of a hearing-impaired user, and configured to:
      receive and display the text captions from the captioning communication service during a call;
      maintain data records in a local database stored in memory of the communication device;
      locally modify the local database responsive to a user input by the hearing-impaired user to the communication device;
      set a flag to an unclean state associated with a data record that is involved in the local modification to the local database of the communication device prior to synchronization with the backend server, the flag being set to be one of add unclean, update unclean, or delete unclean depending on a type of modification made to local database for the data record, wherein the flag being set to be add unclean is indicative of a new data record being created since the last time synchronization occurred with the remote database, the flag being set to be update unclean is indicative of an existing data record being changed since the last time synchronization occurred with the remote database, and the flag being set to be delete unclean is indicative of an existing data record being removed since the last time synchronization occurred with the remote database;

transmit at least a portion of the data records having the flag set to an unclean state to the backend server; and set the flag to a clean state responsive to receiving acknowledgement from the backend server that synchronization was successful.

21. The method of claim 9, wherein modifying the local database includes adding a new data record at a first time, and updating the new data record at a second time while maintaining the same flag value as add unclean prior to synchronization.

\* \* \* \* \*